US008260852B1

(12) United States Patent
 Cselle

(10) Patent No.: US 8,260,852 B1
(45) Date of Patent: Sep. 4, 2012

(54) METHODS AND APPARATUSES FOR POLLS

(75) Inventor: Gabor Cselle, Zurich (CH)

(73) Assignee: Google Inc., Mountain View, CA (US)

( * ) Notice: Subject to any disclaimer, the term of this patent is extended or adjusted under 35 U.S.C. 154(b) by 1198 days.

(21) Appl. No.: 11/071,659

(22) Filed: Mar. 2, 2005

(51) Int. Cl.
*G06F 15/16* (2006.01)

(52) U.S. Cl. ......... 709/204; 709/205; 709/206; 709/207

(58) Field of Classification Search .................. 709/206, 709/207, 204, 205
See application file for complete search history.

(56) References Cited

U.S. PATENT DOCUMENTS

| | | | | |
|---|---|---|---|---|
| 7,200,638 B2* | 4/2007 | Lake | ............................ | 709/206 |
| 7,797,409 B1* | 9/2010 | Secer | ............................ | 709/223 |
| 2004/0122730 A1* | 6/2004 | Tucciarone et al. | ............ | 705/14 |

OTHER PUBLICATIONS

Evite web pages: *Free online invitation and local event listings, Invitation Preview, evite*, 5 pages, copyright 2005.

* cited by examiner

*Primary Examiner* — Adnan Mirza
(74) *Attorney, Agent, or Firm* — Shumaker & Sieffert, P.A.

(57) ABSTRACT

Methods and apparatuses to set up a poll and presenting poll results through electronic communication media. In one embodiment, a user can specify a poll subject, a set of user-defined choices, and a set of poll invitees. The poll invitees are contacted to vote and/or to provide their comments. The invitees' responses are collected and presented. The user may set up the poll at a web site, using an email application, or a special-purpose application. A tool to compose the poll may be integrated with tools for managing personal contact information, such as address book, social network, etc. to simplify the process of specify poll invitees. Content sensitive advertisements can be inserted into the result of the poll. The advertisements can be selected based on the content of the poll subject, user defined choices, invitees' comments, etc.

19 Claims, 9 Drawing Sheets

600

```
<POLL>
    <POLLER>bill.summer@gmail.com</POLLER>
    <SUBJECT>What Is Your Favorite DVD?</SUBJECT>
    <SELECTION>Forrest Gump</SELECTION>
    <SELECTION>Dances With Wolves</SELECTION>
    <SELECTION>Out Of Africa</SELECTION>
    <POLLEE>Invitee A</POLLEE>
    <POLLEE>Invitee B</POLLEE>
    <POLLEE>Invitee C</POLLEE>
    <POLLEE>Invitee D</POLLEE>

•
        •
        •

</POLL>
```

FIG. 6

METHODS AND APPARATUSES FOR POLLS

TECHNOLOGY FIELD

At least some embodiments of the present invention relate to polling using an electronic communication media; and more particularly to setting up and presenting polls.

BACKGROUND

The Internet provides a versatile communication channel for users to communicate with each other. Many applications have been developed to use the Internet to meet various communication needs.

For example, electronic mails (emails) are electronic files that can be transferred from one computer to another over the Internet. For reliable transmission, emails may be queued at various stages of the transmission from the originating computer to the destination. For example, an outgoing email may be queued in a mail server until a communication connection can be made to transfer the email. Typically, incoming emails are queued in the inbox of the computer, waiting for the user to view.

Instant messaging (IM) provides convenient two-way real-time communication between people using a variety of different device types, such as a personal computer (PC), a personal digital assistant (PDA), a digital cellular phone, etc. Instant messaging can incorporate image, voice and/or video. Instant messages are transmitted in a real time fashion over a communication connection between two devices for an instant messaging session. When the communication connection breaks, the instant messaging session ends. For example, when one of the devices used in the instant messaging session shuts down (or restarts, goes offline, etc.), the instant messaging session ends.

Short message service (SMS) is a wireless service that enables the transmission of alphanumeric messages between mobile subscribers and other systems such as electronic mail. Short messaging service center (SMSC) is used to store-and-forward short messages to and from mobile subscribers.

Electronic communication media, such as email, instant messaging, SMS, web sites, etc., provide convenient ways for users to communicate with each other. For example, people may use emails, instant messages, and SMS messages to exchange ideas and opinions.

Some web sites have been designed to help people to plan events. For example, a user may use such a web site to specify a number of guests, send invitation to the guests, and collect responses from the guests as to whether the guests will attend the event.

Some organizations have used web sites to poll the general public in public opinions.

SUMMARY OF THE DESCRIPTION

In one aspect of the present invention, a method includes: disseminating via an electronic media, to a selected group of invitees, a request for selection on a set of user defined choices; and, receiving a response to the request from one or more of the selected group of invitees.

BRIEF DESCRIPTION OF THE DRAWINGS

FIG. 6 illustrates a data format for polls according to one embodiment of the present invention.

DETAILED DESCRIPTION

One embodiment of the present invention allows a user to set up a poll by entering a poll subject, a set of user-defined choices, and a set of poll invitees. The poll invitees are contacted to vote and/or to provide their comments. For example, the invitees may be contacted via email, Short Message Service (SMS) message, instant message, personal web portal, etc., about the poll. The invitees' responses are collected and presented.

The user may set up the poll at a web site, using an email application, or a special-purpose application. A tool to compose the poll may be integrated with tools for managing personal contact information, such as address book, social network, etc. to simplify the process of specify poll invitees.

The poll can be presented as a web page. The invitees may be contacted with a specific link pointing to the web page of the poll. At the web page, the invitees may vote on the set of choices and/or provide comments related to the poll. The result of the poll can be presented in a text and/or graphical format. An invitee may or may not be allowed to see other invitees' comments, status of voting, vote choice, etc.

Content sensitive advertisements can be inserted into the web page of, or otherwise associated with, the poll. The advertisements can be selected based on the content of the poll subject, user defined choices, invitees' comments, etc. For example, Google AdSense related technology can be used to identify relevant advertisements based on the content of the poll subject, choices and comments.

An email application, such as GMail, can be enhanced with functionalities for polls. For example, a poll composition window can be presented for entering the poll subject, choices, and invitees and for submitting the poll set up request to a server.

Similarly, a social network application, such as orkut.com, can be enhanced to poll friends (or friends' friends, etc.).

Environment/System

Figure 1:
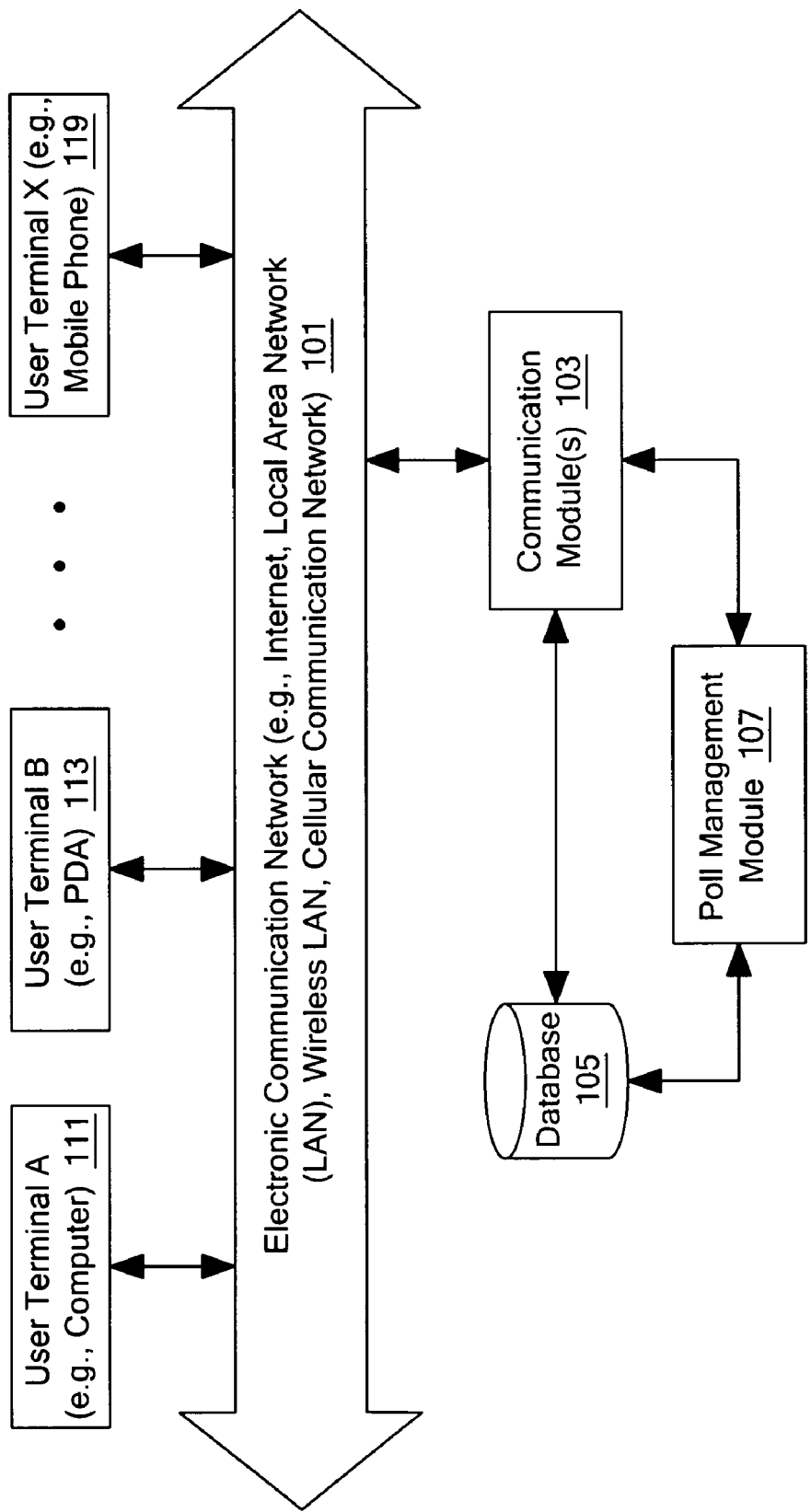
FIG. 1 illustrates a communication system for polls according to one embodiment of the present invention.

FIG. 1 illustrates a communication system for polls according to one embodiment of the present invention.

In FIG. 1, a communication module(s) (103) is used to communicate over the electronic communication network (101) with user terminals, such as user terminal A (111) (e.g., computer), user terminal B (113) (e.g., personal digital assistant (PDA)), user terminal X (119) (e.g., mobile phone), etc. A poll management module (107) is connected to a database (105) and the communication module(s) (103) to set up polls, to receive votes for the polls, to display poll results, etc. for the users who use the user terminals. The communication module (s) (103) may be on a single physical machine or on separated, different physical machines. Similarly, the poll management module and the database may be entirely on a single physical machine or partially on separated, different physical machines.

The electronic communication network (101) may be the Internet, a local area network (LAN), a wireless LAN, a cellular communication network, etc., or a combination of various different types of networks with bridges, routers, gateways, etc.

In one embodiment, the user terminals may use similar applications to communicate with the communication module(s) (103). For example, the server may include a web server; and the user terminals run web browsers to communicate with the web server to set up polls, to receive votes, and to display poll results. Alternatively, a server may include an email server and a gateway to the poll management module (107).

Further, other communication media, such as SMS, instant messaging, etc., can also be used. For example, the communication modules (103) may include a gateway for SMS or instant messages to the poll management module (107). Thus, the user terminals can communicate with the poll management module (107) through the communication modules (103) to set up polls, to vote, and to view poll results.

Alternatively, the user terminals may use different applications to communicate with the communication module(s) (103). For example, a user of a PDA may use instant messages to communicate with communication module(s) (103); a user of a computer may use a web browser to communicate with the communication module(s) (103); and a cellular phone user may communicate with the communication module(s) (103) through SMS.

In one embodiment of the present invention, a user terminal is used to specify a poll subject, a set of user defined choices and a list of invited pollees. The information about the poll is submitted from the user terminal to the communication module(s) (103) and the poll management module (107) and stored in the database (105). The poll management module (107) then uses the communication module(s) (103) to contact the list of invited pollees individually.

For example, the pollees may be contacted via an email message, an instant message, a SMS message, a personal web portal. Further, an invited pollee may be alerted via a voice mail through a text-to-speech system.

The invited pollees can then make their selection and/or provide comments on the poll using their user terminals.

In one embodiment, a user uses the same communication media for receiving the invitation to the poll and for providing their selections for the poll. For example, if the user receives the invitation via an email, the user provides a selection and/or comments via an email.

In general, the users may use different communication media for receiving invitations to the poll and for providing their selections for the poll. For example, a user may receive the invitation through email and provide the selection via a web browser or an instant messaging application. In one embodiment, the invitation includes one or more links for accessing the poll using one or more communication media.

Example

Figure 2:
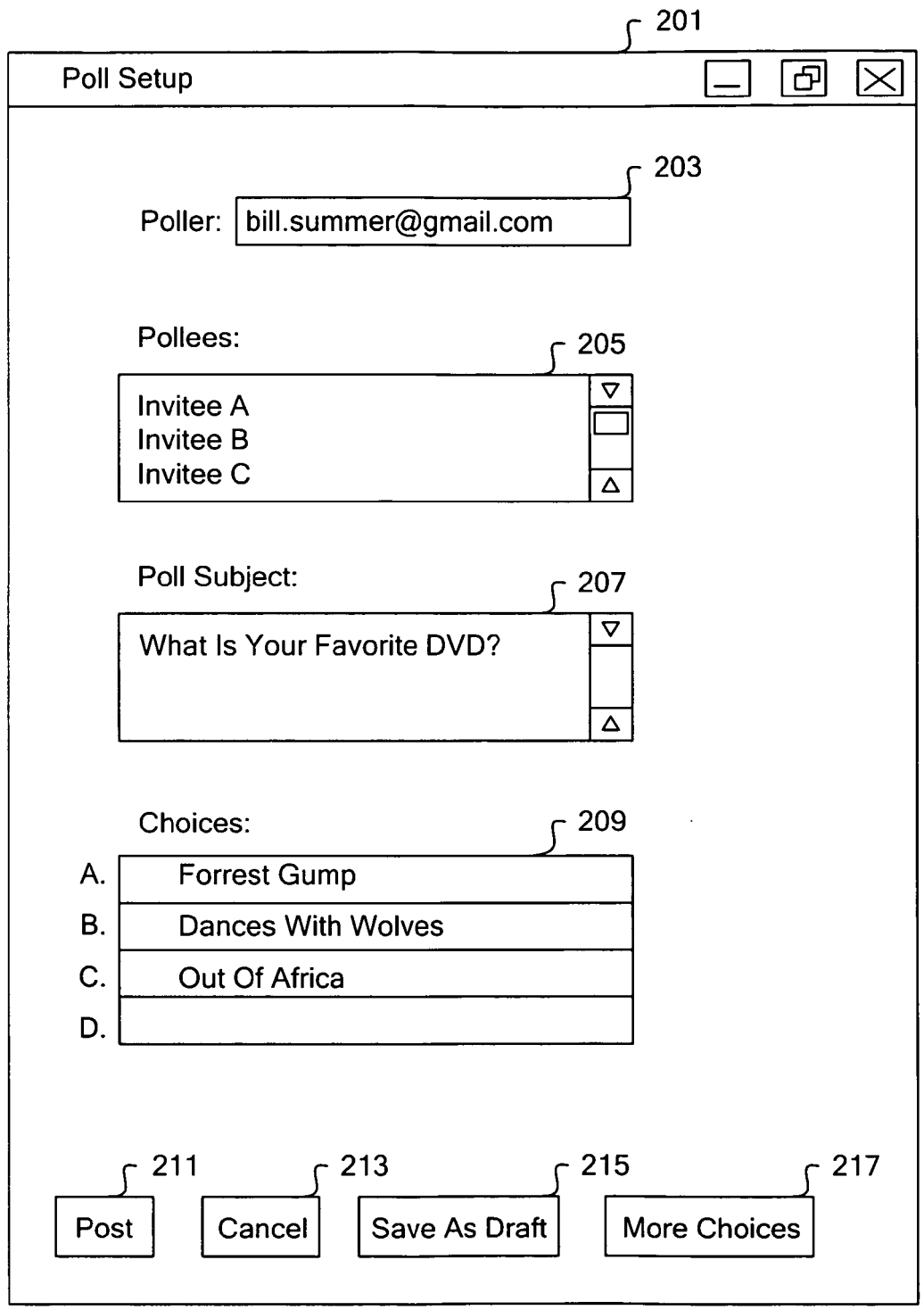
FIG. 2 illustrates a user interface to set up a poll according to one embodiment of the present invention.

FIG. 2 illustrates a user interface to set up a poll according to one embodiment of the present invention.

In FIG. 2, a user interface (201) allows the user to specify information for setting up a poll. The user interface (201) may be a general-purpose web browser with a user interface page downloaded from a server (e.g., communication module(s) 103 in FIG. 1), a Wireless Application Protocol (WAP) browser, or a custom application, such as a custom email program, etc.

The user interface (201) contains a field (203) to specify the identity of the poller.

In one embodiment of the present invention, a user does not need an account to set up a poll. The user can specify a type of contact information, such as an email address, a mobile phone number, a user identifier of an instant messaging system, a user identifier of a personal web portal system, etc. Via the contact information the user can be informed of the poll and ways to access the poll after the poll is set up (e.g., through a web site, an email address designated to received setup requests, etc.).

For example, the user may provide an email address of the user; and a notification about the poll can be sent to the email address of the user to provide a web link to the poll and/or an email (or instant message, or SMS) template to access the poll via email.

Alternatively, the user may not provide contact information of the user. The user identity can be derived from information associated with the submission of the request. For example, the user may log into an account (e.g., via a web site) to set up the poll; and the user identity and/or contact information can be obtained from the database about user accounts. Alternatively, the user may submit the information from an email program; and the return email address of the user can be used. Alternatively, when a cell phone is used to start a poll, the identity of the poller can be inferred from the phone number (e.g., through caller ID service or automatic number identification service and account records at the phone company, etc.) Further, the user may use a hardware device (such as a personal ID card on-a-chip, or radio frequency identification (RFID) tags) to identify himself/herself to the user terminal (e.g., 111, 113, 119) which could, through a custom application, automatically fill in his identity in the poll.

In one embodiment of the present invention, the poll is open to a set of invited pollees. The user can specify the pollees in the field (205). In one embodiment, the field (205) is a text area, into which a user can type in various types of information to identify the pollees, such as the nickname, the cell phone number, screen name, instant message identifier, etc. Alternatively, a list box can be used to show the listed of selected pollees in a predetermined format (e.g., nickname followed by the email address); a separate user interface element (such as a entry box, not shown in FIG. 2) can be used to enter the information to identify a pollee to addition to the list; and a pollee in the list can be selected for removal from the list.

In one embodiment of the present invention, the user interface (201) is linked to an address book of the user. Thus, the user does not have to input the details of the contact information of the pollees. The user can specify the name of the pollees; and the contact information can be looked up from the address book of the user. Alternatively, the user can also directly specify the contact information of the pollees (e.g., for the pollees who are not listed in the address book of the user). In one embodiment of the present invention, the contact information of pollees which is not in the address book of the user is automatically identified for adding into the address book of the user. Alternatively, pollees could be specified from a social network of the user (e.g. using orkut.com). For example, the polling feature can be a part of orkut.com so that a user can poll friends (or friends' friends, etc.). Alternatively, a polling application can contact orkut.com to get a list of friends of the user.

For example, in one embodiment, the pollees are invited using an email message; and email addresses of the pollees are used. Different types of information can be used to look up the email addresses. For example, the pollee can be specified using the email address of the pollee, or a mobile phone number of the pollee, or a user identifier of the pollee, or a nickname of the pollee used in the address book of the user.

In another embodiment, different types of contact information, such as, email address, phone numbers, etc., can be used to contact the pollees.

In one embodiment, when the email address of a pollee is not available, an instant message may be used to invite the pollee. If no email address and instant messaging user information is available for the pollee, a SMS message may be used based on mobile phone number. If no email address, instant messaging user information and mobile phone number is available for the pollee, a voice message to a phone number of the pollee via a text-to-speech module may be used. In one embodiment of the present invention, a text based notification method has a priority over non-text based notification methods.

In one embodiment, the pollee is invited via one preferred electronic media selected according to convenience or user preferences. Alternatively, a pollee may be invited via multiple electronic media.

The user interface (201) contains a field (207) for specifying a subject of the poll and fields (209) for specifying a set of user defined choices. A button (217) can be used to request a user interface that provides more fields for specifying choices. Also, descriptive or other information (e.g., text, video, images, sound) may also be added to the poll to further clarify the poll's subject or possible choices. For example, the user may specify icons for the choices, sound clips for the choices, a video clip for the poll subject, etc. The user interface elements such additional information (not shown in FIG. 2) can be added to the user interface of FIG. 2 or in a separate window/screen.

In one embodiment of the present invention, the user interface (201) includes a button (215) for saving the poll setup as a draft so that the poll is not posted immediately and can be modified at a later time. A button (213) can be used to cancel the setup; and a button (211) can be used to post the poll and request the server to send out the invitation to the pollees.

In one embodiment of the present invention, the user interface (201) is presented as a web page downloaded from a web server into a web browser. When the entry form is completed and the user presses a button to submit the data about the poll, the web browser uploads the data to the web server (e.g., using hypertext transfer protocol (HTTP)). The web server provides the data to a poll management module, which stores the data into a database, generates invitations to the pollees, and sends out the invitations.

In one embodiment, the user interface (201) is part of an email application. The email application formats the data in a format according to an email gateway application and sends the data in an email. For example, the data can be formatted in Extensible Markup Language (XML) and submitted to an email address designed to receive the requests for setting up polls.

Alternative, the data may be submitted in an SMS message or an instant message to an address designed to receive the requests for setting up polls.

Although FIG. 2 shows an example implemented a graphical user interface system, other types of user interfaces can also be used. For example, a text based user interface can be used to enter the poll data. Further, the data may not be sent all at once. For example, when an SMS system is used, a number of messages can be used submit the data. For example, a first SMS message with the poller information may be used to request a poll identifier; after obtaining a poll identifier from a return SMS message, subsequent SMS messages can be used to specify the pollees, poll subject, and choices. SMS messages from the server can be used as prompts and templates for specifying pollees, poll subjects, choices, etc.

Further, the data may be submitted through a voice message system. In one embodiment, a user can call a number designed to receive requests for setting up polls. A voice recognition system converts the voice input into text-based poll data and presents the poll data to the poll management module. During the period of voice input, the system may further use text-to-speech to provide feedback to the user. In one embodiment, the user may select a poll identifier for a specific poll. The poll identifier can subsequently used for request poll requests and user interfaces for vote in the poll.

Alternatively, custom client and server applications can be used for setting up the polls.

Figure 3:
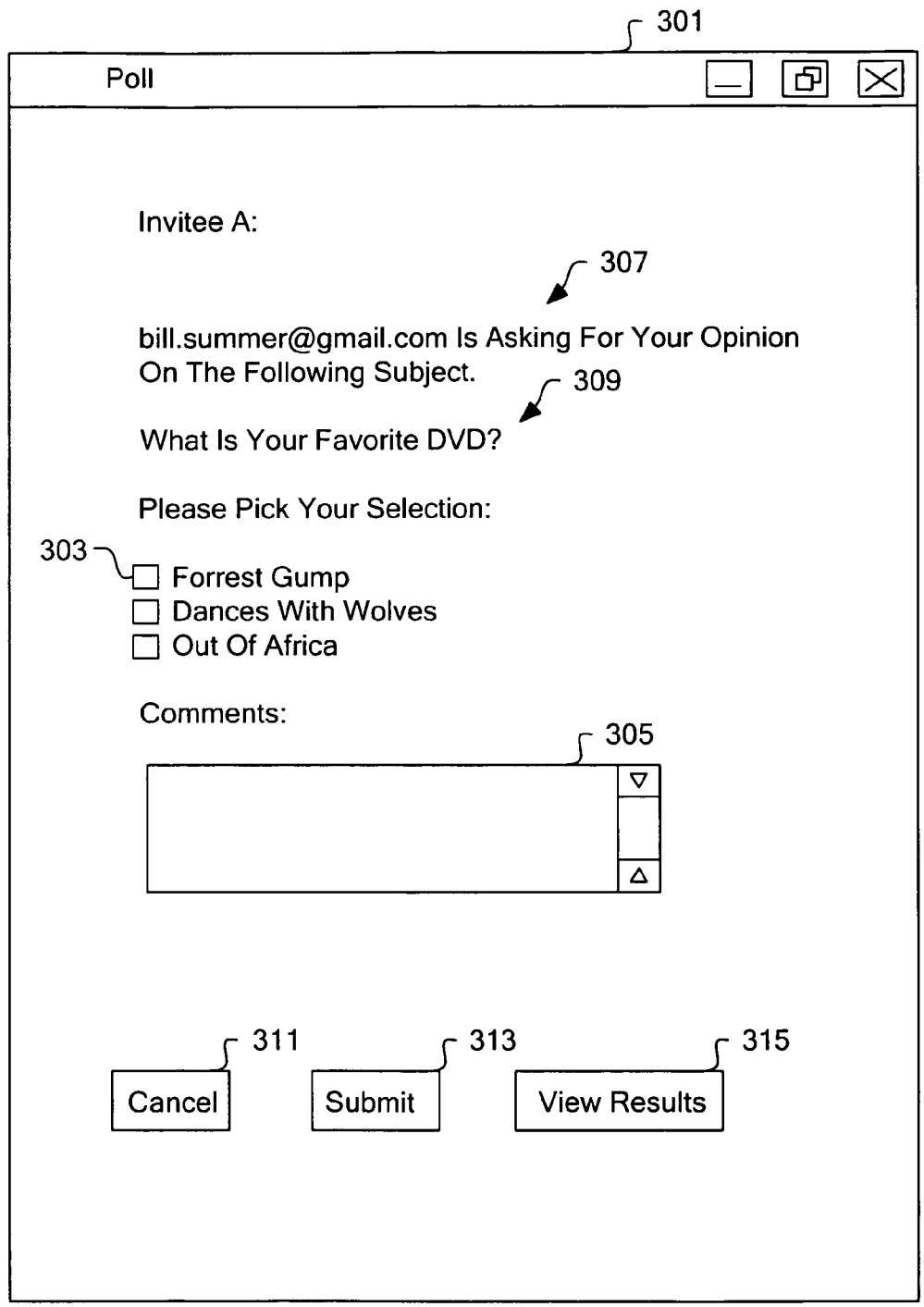
FIG. 3 illustrates a user interface to collect user choices according to one embodiment of the present invention.

FIG. 3 illustrates a user interface to collect user choices according to one embodiment of the present invention.

In one embodiment of the present invention, a pollee is invited to a poll which is presented in a web browser, an email application, a personal web portal, or a custom client application.

In FIG. 3, a user interface (301) allows a pollee to specify the choice and comments for the poll. The user interface (301) presents the information about the poller (e.g., 307), the subject of the poll (e.g., 309) and choices for the poll (e.g., 303).

In one embodiment, a group of radio buttons is used to receive user input for the selection of a choice. Only one choice can be selected. Alternatively, checkboxes are used; and a pollee may specify more than one choice. In one embodiment of the present invention, a poller can specify whether multiple choices are allowed during setting up the poll; and the poll interface is then presented according to the poller's specification.

In one embodiment, the user interface (301) contains a text area (305) to receive comments about the poll a pollee may have. For example, the pollee may provide comments on one of the choices and/or provide additional choices (e.g., 303).

In one embodiment, a button (311) can be used to cancel the input form; a button (313) can be used to submit the selection and/or comments; and a button (315) can be used to request a view of the poll results. In one embodiment of the present invention, when the button (313) is selected, the data received in the form is transmitted to the poll management module (e.g., 107 in FIG. 1) and a view of the poll result is presented.

In one embodiment of the present invention, the user interface (301) is presented as a web/WAP page in a web browser. Alternatively, the user interface (301) may be presented as a part of an email application, designed to show emails related to polls. For example, when the email application detects that an incoming email is to collect selection and/or comments from the pollee for a poll, the user interface (301) is presented in place of a regular email message viewer.

Alternatively, similar user interfaces can be implemented in instant messaging systems and SMS systems. The user interface (301) may be implemented on a graphical user interface system as one screen. Alternatively, the user interface (301) may be implemented as multiple screens on a text-based system. Further, the information may be presented through a text-to-speech system (e.g., as a voice message for a phone system); and the user voice input may be recognized and converted into text (e.g., through a voice phone call to a gateway) for submission to the poll management module (e.g., 107 in FIG. 1).

Figure 4:
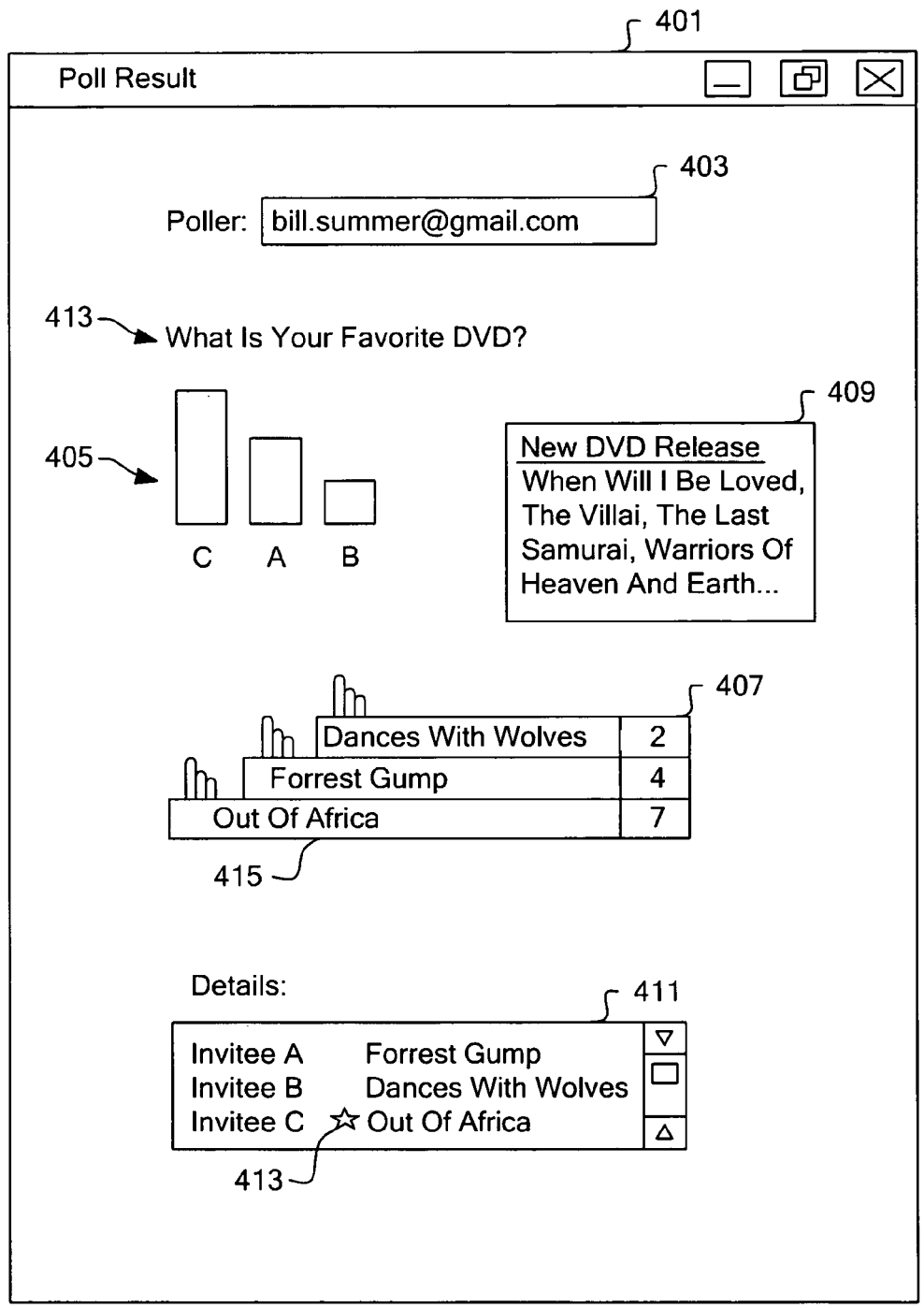
FIG. 4 illustrates a user interface to present poll results according to one embodiment of the present invention.

FIG. 4 illustrates a user interface to present poll results according to one embodiment of the present invention.

In FIG. 4, the user interface (401) presents the poll results in a user friendly way. The user interface (401) presents the poll subject (413) and, optionally, the information about the poller (403). A graphical chart (405) is used to show the vote counts in a graphical way. Vote counts are also presented in a numerical format as text labels (407) for corresponding poll choices (415).

In one embodiment of the present invention, the poll choices are sorted according to the corresponding vote counts.

In one embodiment of the present invention, a selection box (411) is provided to allow one to see the details of the poll. For example, the pollees and their choices are listed in the selection box (411). One can scroll down the list to see how a particular pollee made the selection. Further, in one embodiment, a mark (e.g., 413) is used to indicate that the corresponding pollee provided comments on the poll. Thus, one can select the corresponding pollee in the selection box (411) to view the comments.

In one embodiment of the present invention, the poller may specify whether or not the pollees can see any or some of the details of the poll result. For example, the poller may specify that the pollee can only view the distribution and vote counts but not the list of pollees and their detailed selections. In one embodiment, only a pollee's own selection and comments are displayed. Alternatively, the poller may allow the pollees to view other pollees' selections and comments.

Further, in one embodiment, a pollee may specify whether the pollee's selection and comments are public. If the pollee selects a private submission, the pollee's selection and comments are not presented to other pollees except the poller. If the pollee selects a public submission, the pollee's selection and comments will be accessible to all invited pollees of the poll.

In one embodiment of the present invention, an advertisement (409) is presented in the user interface (401). In one embodiment, the advertisement is selected in such a way so that the advertisement is relevant to the poll and likely of interest to the poller and pollees. For example, in one embodiment, the content of the poll is determined based on the poll subject, the poll choices and/or the comments from the pollees. A set of advertisements can be ranked according to relevancy of the advertisements to the content of the poll. One or more advertisements relevant to the poll are displayed in the user interface (401).

Further, in one embodiment of the present invention, advertisements can also be inserted into the form for receiving pollees' selection, such as in the user interface (301) of FIG. 3, according to the poll subject, poll choices and the previously received responses (if any, from the same pollee or different pollees).

In one embodiment of the present invention, the poller may specify different weight for different invitees. For example, an invitee has a default weight of one; and a poller may specify a weight higher (or lower) than one for one or more invitees. The vote counts are weighted according to the poller specified weights to show the graphical distribution. And, the weighted vote counts can be presented numerically in text labels. The weighting of responses can also be based on the frequency of e-mail exchanges with this person (e.g., on GMail) or the friend ranking on orkut.com. In orkut.com, a user can rank a friend on a scale of "haven't met", "acquaintance", "friend", "good friend", "best friend", which can be used as a scale to weigh the poll responses so that the response from good, best friends have heavier weights than haven't-met friends.

The user interface (401) can be presented through web/WAP browsers, client programs of instant message systems or SMS systems through a graphical user interface system. Alternatively, text-based user interfaces can be used without presenting graphical charts of the vote results. Alternatively, poll result data may be shown only for a subset of the pollees. For example, the displayed poll responses can be from a manually selected subset of pollees or from a subset automatically selected based on the properties of the pollees (e.g., male/female, frequency of e-mail exchange, friend rating, etc.).

In one embodiment of the present invention, the poll data uses the address book maintained for users to simplify the process of specifying pollees and reduce the amount of data to be maintained in a database.

Figure 5:
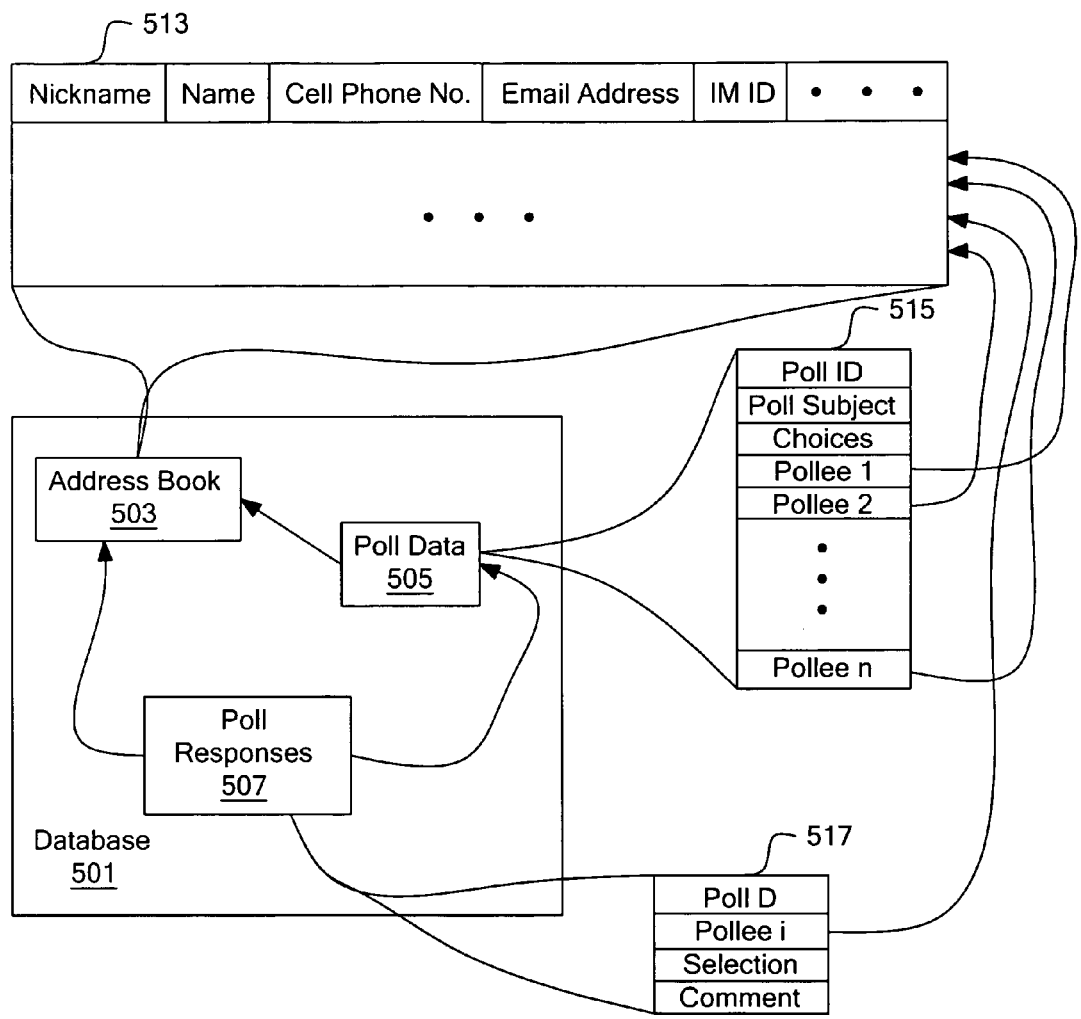
FIG. 5 illustrates a data structure for managing polls according to one embodiment of the present invention.

FIG. 5 illustrates a data structure for managing polls according to one embodiment of the present invention.

In FIG. 5, the database (501) contains address book (503) maintained for a user, poll data (505) submitted by the user as a poller, and poll responses (507) received for the poll.

The address book (503) contains address information of a list of people maintained for the user. The address information may include nickname, name, cell phone number, email address, instant message (IM) ID, etc. (513). Note that an address book may maintain more or less fields for each person. For example, in one embodiment, the address book may only have fields form name and email address.

In another example, the address book may contain only the field of user ID in a system where the user ID can be used to access a personal web portal, web-based email and/or instant messages.

In one embodiment of the present invention, the user can specify the nickname of the person in the address book to add the person into the list of pollee. In one embodiment of the present invention, the list of persons in the address book is presented in a selection box so that the user can select from the selection box to specify the pollees. Alternatively, the user may specify the cell phone number, IM ID or the email address of the person; and the system looks up the person in the address book according to the specified cell phone number, IM ID or the email address.

In one embodiment of the present invention, the data for the poll (515) includes poll subject, choices, and a list of pollees. In one embodiment, the pollees in the poll are represented as pointers pointing to the entries in the address book.

In one embodiment, a poll is assigned a unique id; and a poll response for the poll (e.g., 517) contains the poll id, a pollee represented as a pointer pointing to the address book, a selection and a comment field (which can be null if no comment is submitted by the pollee).

Thus, in the embodiment of FIG. 5, the poll data (505) and poll responses (507) refer to the address book (503) for the pollee information.

In one embodiment, the address book is maintained for an email application, a personal social network, or a personal digital assistant application.

In one embodiment, a user can define a group of friends in the address book; and the entire group can be selected for the list of pollees. The group can also be selected from a social network. Further, one may specify pollees from a specified operation of one or more groups, such as "top ten of the most frequent senders of emails to me", "friends of me and Kate", "groups A and B but not C", etc.

FIG. 6 illustrates a data format for polls according to one embodiment of the present invention.

In one embodiment of the present invention, the data about a poll is transmitted between a client application (e.g., running on a user terminal, such as 111, 113, 119, etc., of FIG. 1) and a server application (e.g., communication module(s) 103 or poll management module 107 of FIG. 1). In one embodiment, the data is formatted in a standardized form so that different applications and server modules can communicate poll data with each other to submit the poll data for setting up a poll, present the selection user interface, and/or present the poll results.

In FIG. 6, the poll data is formatted in XML. Thus, an email application program can submit the poll data to an email gateway (e.g., as part of communication module(s) 103 of FIG. 1) to set up a poll. The email application program can receive the poll data in collecting votes and comments. The email application program can receive the poll result data for presentation.

When the XML format is used, even if a pollee uses an email client that does not understand the tags, the user can still understand the information and/or use the tag template to submit information. For example, when the user request to set up a poll, a reply email can provide a template in XML; the user can modify the template to generate an email message including the poll subject, choices, etc., which can be emailed to a gateway address to set up the poll.

Similarly, the SMS or instant message gateway may be used to transmit the poll information through SMS or instant message.

Although an XML based format is illustrated in FIG. 6, from this description, one understands that various different types of standard or custom formats can be used. For example, keyword and value pairs can be used to specify the poll data.

Figure 7:
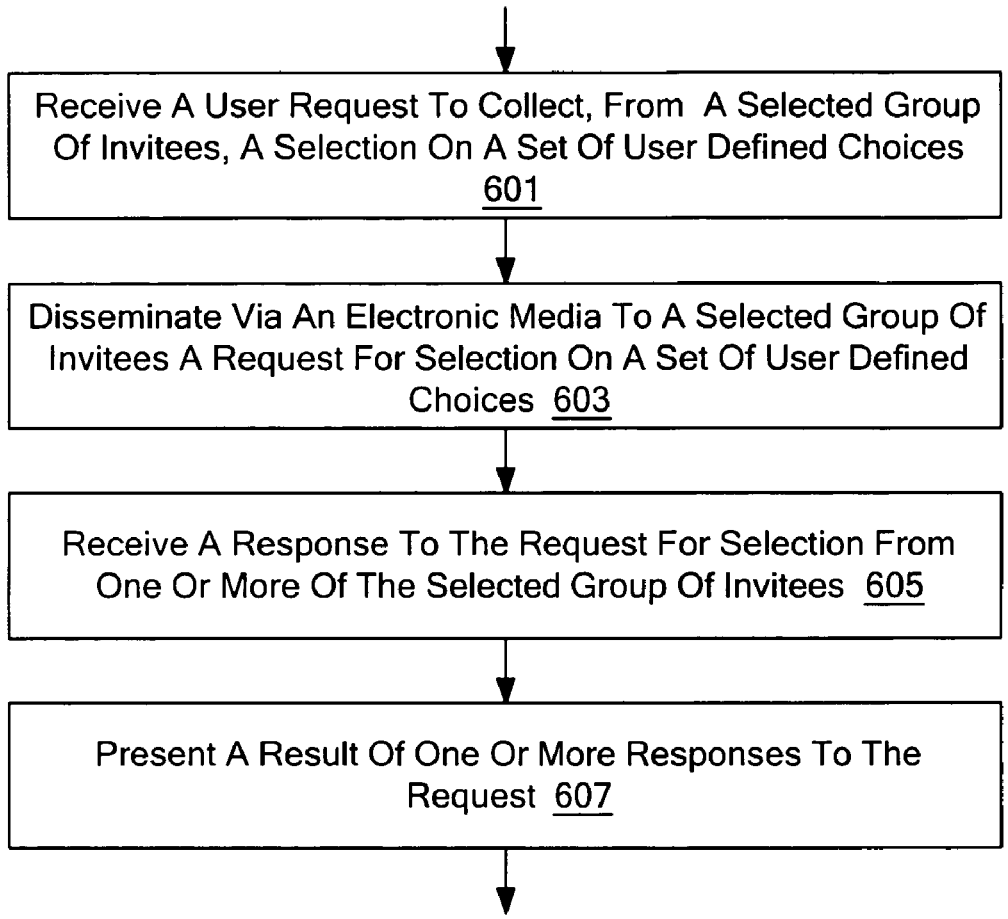
FIG. 7 illustrates a flow diagram according to one embodiment of the present invention.

FIG. 7 illustrates a flow diagram according to one embodiment of the present invention.

In FIG. 7, a user request is received (601) to collect, from a selected group of invitees, a selection on a set of user defined choices. Via an electronic media a request for selection on a set of user-defined choices is disseminated (603) to a selected group of invitees.

In one embodiment, the request is about opinions on personal questions, such as "should we really go hiking this weekend, even though the weather may be bad?", "out of these 5 restaurants, which one should we got to?", "out of these 3 DVDs, which one should we watch?", etc. In one embodiment, the request for selection is not about an event and is not an invitation to a scheduled event.

A response to the request for selection is received (605) from one or more of the selected group of invitees. A result of one or more responses to the request is presented (607).

Figure 8:
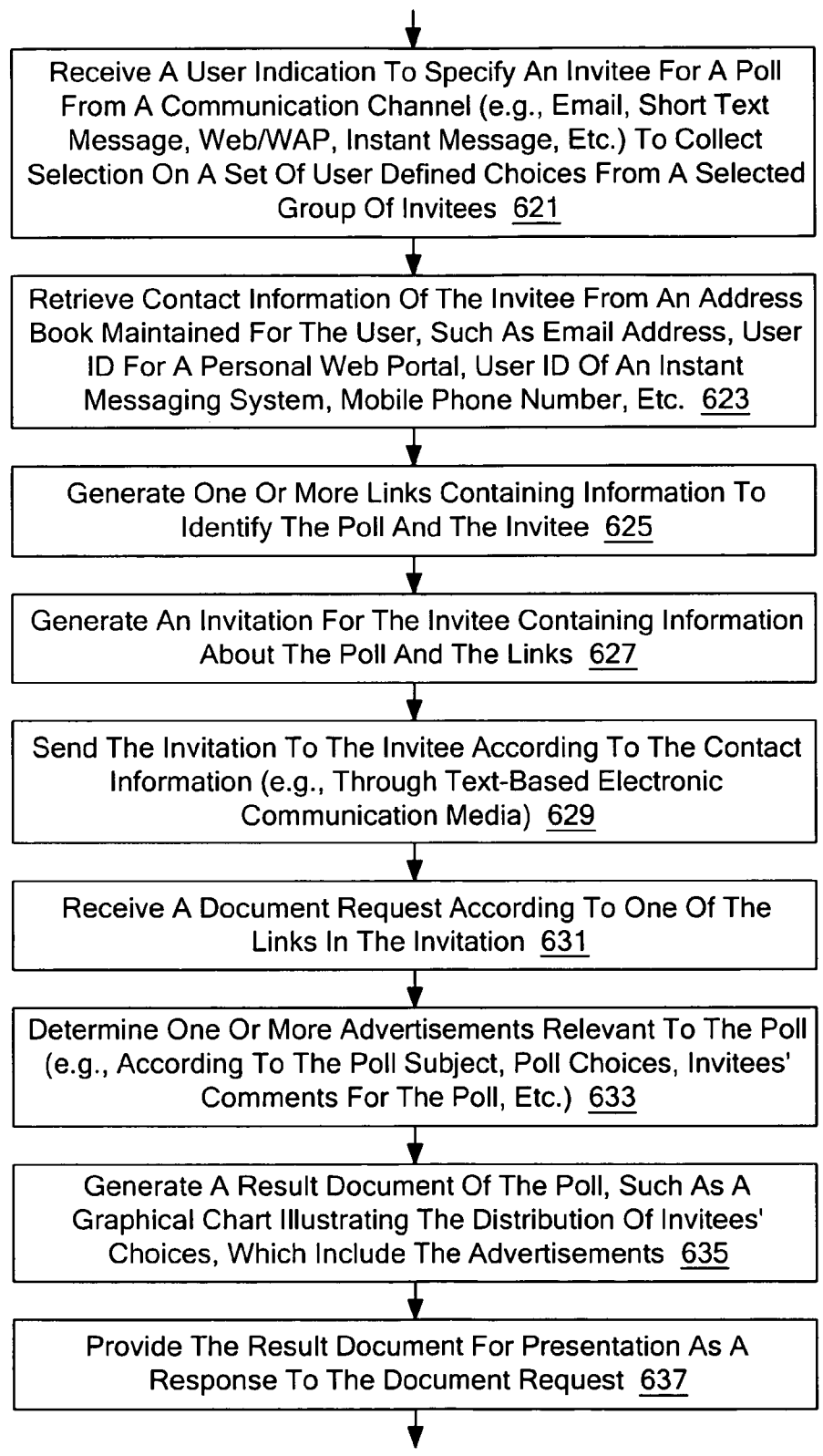
FIG. 8 illustrates another flow diagram according to one embodiment of the present invention.

FIG. 8 illustrates another flow diagram according to one embodiment of the present invention.

A user indication is received (621) to specify an invitee for a poll from a communication channel (e.g., email, short text message, web/WAP, instant message, etc.) to collect selection on a set of user-defined choices from a selected group of invitees. Contact information of the invitee is retrieved (623) from an address book maintained for the user, such as email address, user ID for a personal web portal, user ID of an instant messaging system, mobile phone number, etc.

One or more links containing information to identify the poll and the invitee is generated (625). An invitation for the invitee containing information about the poll and the links is generated (627). The invitation is sent (629) to the invitee according to the contact information (e.g., through text-based electronic communication media).

For example, a link to a web page designed for the poll may be sent in an email to invitee according to the address book. Alternatively, the one or more links may provide information for an email program to present a user interface for the poll.

A document request according to one of the links in the invitation is received (631). One or more advertisements relevant to the poll (e.g., according to the poll subject, poll choices, invitees' comments for the poll, etc.) are determined (633). A result document of the poll, such as a graphical chart illustrating the distribution of invitees' choices, which include the advertisements, is generated (635). The result document is provided (637) for presentation as a response to the document request.

For example, after the user requests for the web page according to the link is received at the server, the server determines advertisement placements for the web page of the poll and presents the poll result and/or the form to vote for the poll. Alternatively, the user may receive the poll through email with the invitation; and the server selects the advertisement in generating the invitation and sends the advertisement with the invitation through email (or instant message, SMS message, a custom client/server message for a poll application, etc.)

Hardware

Figure 9:
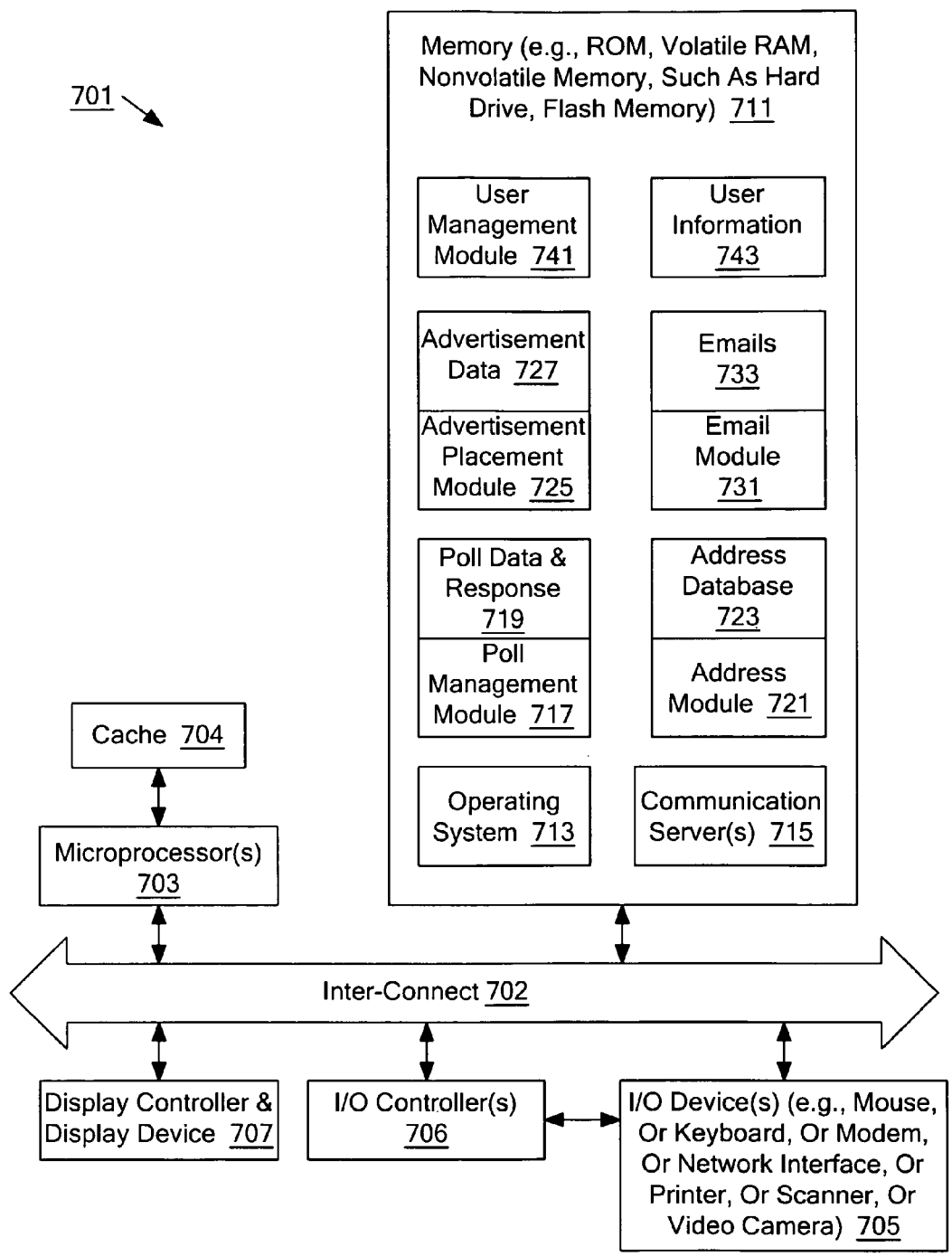
FIG. 9 illustrates a server system to manage polls according to one embodiment of the present invention.

FIG. 9 illustrates a server system to manage polls according to one embodiment of the present invention.

While FIG. 9 illustrates various components of a computer system, it is not intended to represent any particular architecture or manner of interconnecting the components. Other systems that have fewer or more components may also be used with the present invention.

In FIG. 9, the communication device (701) is a form of a data processing system. The system (701) includes an inter-connect (702) (e.g., bus and system core logic), which interconnects a microprocessor(s) (703) and memory (711). The microprocessor (703) is coupled to cache memory (704) in the example of FIG. 9.

The inter-connect (702) interconnects the microprocess(s) (703) and the memory (711) together and also interconnects them to a display controller and display device (707) and to peripheral devices such as input/output (110) devices (705) through an input/output controller(s) (706). Typical I/O devices include mice, keyboards, modems, network interfaces, printers, scanners, video cameras and other devices which are well known in the art.

The inter-connect (702) may include one or more buses connected to one another through various bridges, controllers and/or adapters. In one embodiment the I/O controller (706) includes a USB (Universal Serial Bus) adapter for controlling USB peripherals, and/or an IEEE-1394 bus adapter for controlling IEEE-1394 peripherals.

The memory (711) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

The memory (711) stores an operating system (713), communication server(s) (715), user management module (741) and user information (743). The communication server(s) (715) may include a web/WAP server, an email/instant message/SMS message gateway, and/or a custom server for communication with custom client applications.

In one embodiment, the memory (711) further stores poll management module (717), address module (721), email module (731), and advertisement placement module (725).

The address module (721) maintains address books in address database (723) for users according to user information (743) and user management module (741). A user can use the address in the address book of the user to specify pollees. In one embodiment, the system automatically selects one contact address for text-based electronic communication media from the address book to invite a pollee to the poll. In one embodiment of the present invention, the user selects one if a pollee can be reached in multiple ways.

In one embodiment of the present invention, the poll management module (717) sets up poll and store poll data and responses (719). In one embodiment, the poll management module (717) generates invitations to the pollees, specified by the poller, and sends the invitations to the pollees using the contact information obtained from the address database (723) and using the communication server(s) (715).

The invitation may be sent through email, instant messages, SMS messages, voice messages through text-to-speech, etc. In one embodiment, the invitation contains a link to a web/WAP page so that the pollees can visit the web/WAP page to vote and view result. In one embodiment, the invitation contains a web page for the view result. In one embodiment, the invitation contains the information about the poll and a template for sending back vote and/or comments via instant/SMS messages or emails and request for the poll result.

In one embodiment, emails can be used to set up polls, invite pollees, received votes, and send poll results. The email module (731) monitors the emails (733) to filter poll related information for poll management module (717). In one embodiment, the email module (731) treats polls as a special type of email; and a presents a user interface designed for polls when the email message is poll related and when the user accesses email through a web site.

In one embodiment of the present invention, advertisement placement module (725) manages the placement of advertisements in poll related documents (e.g., web page, email, SMS/instant message). Advertisement data (727) contains a set of advertisements to be targeted in related documents. When an advertisement matches a poll (e.g., based on keywords, content, context, category, etc.), the advertisement is included in a document for the poll.

FIG. 9 shows a server data processing system according to one embodiment of the present invention.

Further, a user terminal as a client system can be a data processing system similar to the system of FIG. 9. A client system can be in the form of a PDA, a cellular phone, a notebook computer or a personal desktop computer. A typical client system does not have poll management module, advertisement placement module, user management module, and communication server(s). A typical client system has communication client(s) for emails, instant messages, and/or SMS messages. The communication client(s) may be customized to recognize poll related messages and present these messages in a special, user-friendly fashion, as illustrated in FIGS. 2-4.

Alternatively, the traditional communication client(s) may be used in some embodiments of the present invention.

General

The present invention is illustrated by way of example and not limitation in the figures of the accompanying drawings in which like references indicate similar elements.

A "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Although some examples of the present invention are illustrated in the context of an instant messaging system. However, machine presence according to embodiments of the present invention can also be used with other types of networks. For example, communication networks in which users can be connected to each other according to user identifiers, regardless of the communication devices used, can have machine presences implemented to allow the identification of machines and resources associated with users. For example, a peer-to-peer file-sharing network may use the persistent machine presences that are associated with user identifiers to allow the continuation of interrupted file transferring operations.

The description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as a microprocessor.

A machine readable medium can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.).

For example, a machine readable medium includes recordable/non-recordable media, such as read only memory (ROM), random access memory (RAM), magnetic disk storage media, optical storage media, flash memory devices, etc., as well as electrical, optical, acoustical or other forms of propagated signals, such as carrier waves, infrared signals, digital signals, etc.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The present invention includes methods and apparatuses which perform these methods, including data processing systems which perform these methods, and computer readable media which when executed on data processing systems cause the systems to perform these methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   receiving, using a user interface of a computing device, input from a user to specify a selected group of invitees to participate in a poll;
   receiving, using the user interface, input from the user to specify a user-defined poll subject and a set of user-defined choices that make up the poll;
   based at least in part on the user-defined poll subject and the set of user-defined choices, generating the poll and a request to participate in the poll;
   disseminating via an electronic media over a plurality of different communication channels, to the selected group of invitees, the request to participate in the poll, wherein the request comprises an invitation to provide a selection and the invitation does not invite the selected group of invitees to an event;
   receiving a plurality of responses, selected from the set of user-defined choices, to the request from two or more of the selected group of invitees via the plurality of different communication channels; and
   organizing automatically the responses to the request from the two or more of the selected group of invitees for the user as a result of the poll of the selected group of invitees;
   receiving an invitee request for a document related to the poll;
   selecting one or more advertisements relevant to the user-defined poll subject;
   generating the document showing a result of selections by at least a portion of the selected group of invitees and the one or more advertisements; and
   providing the document in response to the invitee request.

2. The method of claim 1, wherein the request is sent in an email message and the response is received in one or more email messages.

3. The method of claim 1, wherein the invitation is sent over the plurality of different communication channels through at least two of:
   an email message;
   a short text message;
   a personal web portal; or
   an instant message.

4. The method of claim 1, wherein the invitation comprises a question for the user-defined choices and the user-defined choices.

5. The method of claim 1, wherein the invitation further comprises a link to a document, which provides a user interface for one of:
   viewing a result of selections by the selected group of invitees; and
   selecting one from the set of user-defined choices.

6. The method of claim 3, wherein the responses are received in two or more of:
   an email message;
   an instant message; and
   a short message.

7. The method of claim 1, wherein the result of selections is in a graphical form in the document.

8. The method of claim 1, further comprising:
   sorting the set of user-defined choices according to the result of selections into a sorted order;
   wherein the document shows the set of user-defined choices according to the sorted order.

9. The method of claim 1, wherein relevancy of advertisements to the request for selection is determined based on the set of user-defined choices.

10. The method of claim 9, wherein relevancy of advertisements to the request for selection is further determined based on invitee responses to the request; and
   the invitee responses comprise comments from one or more of the selected group of invitees provided in response to the request for selection.

11. The method of claim 1, further comprising:
   receiving a user request to collect, from the selected group of invitees, selection from the set of user-defined choices.

12. The method of claim 11, wherein the user request is received via one of:
- email message;
- short text message; or
- instant message.

13. The method of claim 12, wherein the user request includes user specified weight factors for members of the selected group of invitees.

14. The method of claim 11, further comprising:
- receiving an indication from a user to specify one of the selected group of invitees; and
- retrieving contact information of the one of the selected group of invitees according to the user indication from address information maintained for the user.

15. The method of claim 14, wherein the contact information comprises one of:
- email address;
- mobile phone number;
- user identification for a personal web portal system; or
- user identification for an instant messaging system.

16. A non-transitory computer-readable storage medium having instructions stored thereon, which when executed by a computer system, cause the computer system to perform operations comprising:
- receiving, using a user interface of a computing device, input from a user to specify a selected group of invitees to participate in a poll;
- receiving, using the user interface, input from the user to specify a user-defined poll subject and a set of user-defined choices that make up the poll;
- based at least in part on the user-defined poll subject and the set of user-defined choices, generating the poll and a request to participate in the poll;
- disseminating via an electronic media over a plurality of different communication channels, to the selected group of invitees, the request to participate in the poll, wherein the request comprises an invitation to provide a selection and the invitation does not invite the selected group of invitees to an event;
- receiving a plurality of responses, selected from the set of user-defined choices, to the request from two or more of the selected group of invitees via the plurality of different communication channels; and
- organizing automatically the responses to the request from the two or more of the selected group of invitees for the user as a result of the poll of the selected group of invitees;
- receiving an invitee request for a document related to the poll;
- selecting one or more advertisements relevant to the user-defined poll subject;
- generating the document showing a result of selections by at least a portion of the selected group of invitees and the one or more advertisements; and
- providing the document in response to the invitee request.

17. The method of claim 1, further comprising;
- presenting an advertisement to the user using the user interface, wherein the advertisement is selected based at least in part on one or both of the user-defined poll subject and the set of user-defined choices.

18. The method of claim 1, further comprising:
- presenting to the user a document showing the result of the poll, wherein the document comprises an advertisement selected based at least in part on one of the responses.

19. The method of claim 1, wherein the request to participate in the poll comprises an advertisement selected based at least in part on one or both of the user-defined poll subject and the set of user-defined choices.

* * * * *